J. W. HARRISON, insane,

S. J. HARRISON, guardian, J. W. HARRISON, assignor of one-half interest to C. R. MILLER.

Coal Mining Machine.

No. 9,408. Reissued Oct. 12, 1880.

Fig 1ª

Witnesses:

H. C. Coolidge,

Jno. C. MacGregor

Inventor:

Jonathan W. Harrison,

By Brown & Mackie,

Attorneys.

2 Sheets—Sheet 2.

J. W. HARRISON, insane,

S. J. HARRISON, guardian, J. W. HARRISON, assignor of one-half interest to C. R. MILLER.

Coal Mining Machine.

No. 9,408. Reissued Oct. 12, 1880.

Witnesses:

W. C. Corlies,

Jno. C. MacGregor.

Inventor:

Jonathan W. Harrison,

By Johnson & Thacher

Attorneys

UNITED STATES PATENT OFFICE.

SARAH J. HARRISON, OF JACKSON, MICHIGAN, GUARDIAN OF JONATHAN W. HARRISON, AN INSANE PERSON; SAID JONATHAN W. HARRISON ASSIGNOR, BY MESNE ASSIGNMENTS, OF ONE-HALF OF HIS INTEREST TO CHARLES R. MILLER, OF ADRIAN, MICHIGAN.

COAL-MINING MACHINE.

SPECIFICATION forming part of Reissued Letters Patent No. 9,408, dated October 12, 1880.

Original No. 198,610, dated December 25, 1877. Application for reissue filed August 9, 1880.

*To all whom it may concern:*

Be it known that JONATHAN W. HARRISON, of Adrian, in the county of Lenawee and State of Michigan, invented a new and Improved Machine for Mining Coal, of which the following is a specification.

This invention relates to a machine or apparatus for undercutting and "shearing-in," or producing any other cuts or excavations, such as are required in mining coal preparatory to wedging out or displacing the mass of material.

The machine is constructed with a reciprocating drill or pick of peculiar construction, operated by a piston worked by compressed air or steam under control of either a rotary or reciprocating valve deriving its motion from bucket-wheels which are actuated either by a current or by direct pressure of air or steam conducted from the supply-pipe from which the drill-piston is worked, the amount of compressed air supplied to the valve being regulated by a cock, so as to vary the speed of the valve, and consequently the length and rapidity of stroke of the drill-piston, while the pressure on the latter is unchanged and the valve is operated independently of said drill-piston.

The peculiarity in the reciprocating drill or pick consists in forming it with a double flaring point and a concave face, whereby it is caused to cut properly in line and is preserved from deflection by contact with the coal, the piston-rod which carries the drill or pick being guided so as to keep the working-face in one plane.

Figure 1:
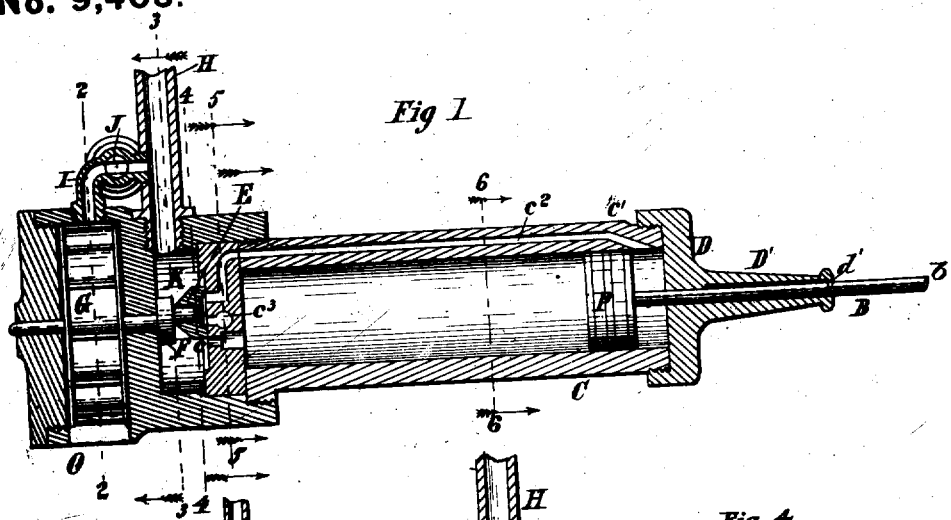
Figure 2:
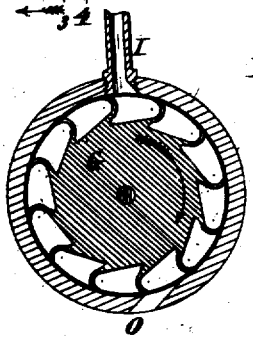
Figure 3:
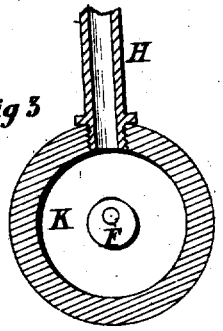
Figure 4:
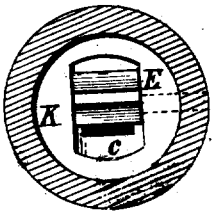
Figure 5:
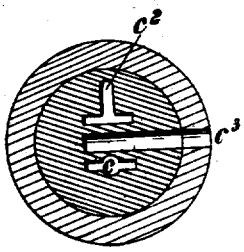
Figure 6:
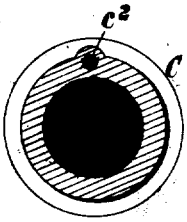
Figure 7:
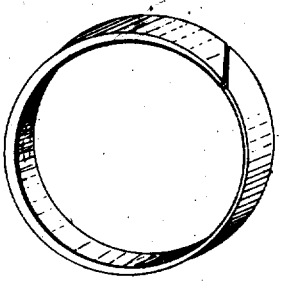
Figure 7:
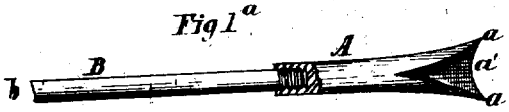
Figure 9:
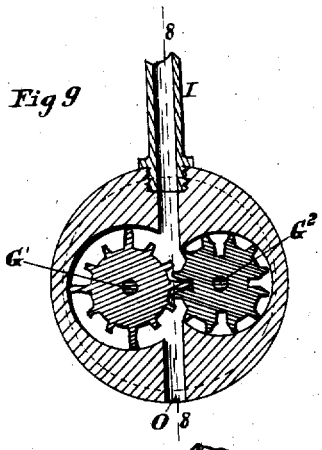
Figure 8:
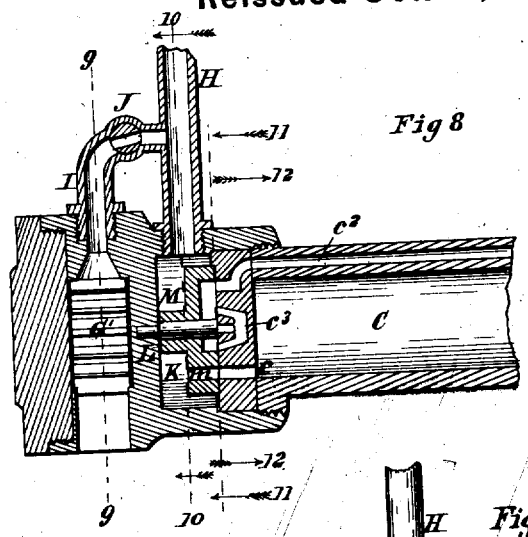
Figure 10:
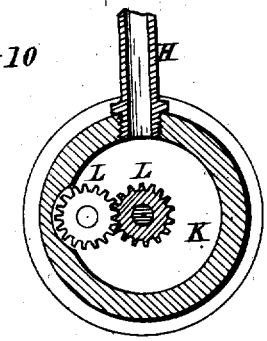
Figure 12:
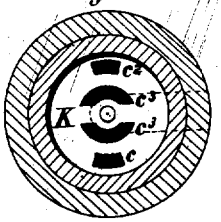
Figure 11:
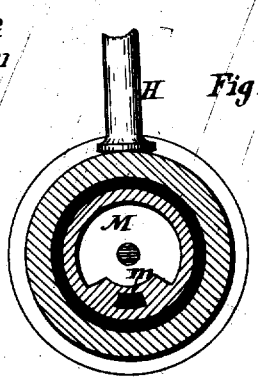
Figure 13:
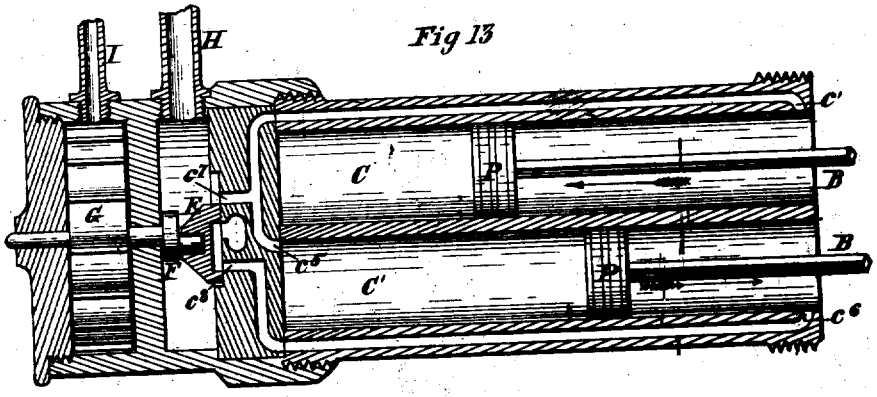

In the accompanying drawings, Figure 1 is a longitudinal section of the working parts, omitting the drill-head. Fig. 1ª is an elevation, on a larger scale, of the reciprocating drill or pick and a portion of the rod to which it is attached. Fig. 2 is a transverse section of the valve-wheel in the line 2 2, Fig. 1. Fig. 3 is a transverse section on the line 3 3, Fig. 1, showing the eccentric or crank which operates the valve. Fig. 4 is a transverse section on the line 4 4, Fig. 1, showing the reciprocating valve in elevation. Fig. 5 is a transverse section through the air or steam ports on the line 5 5, Fig. 1. Fig. 6 is a transverse section through the cylinder on the line 6 6, Fig. 1. Fig. 7 is a perspective view, on a larger scale, of an eccentric ring used for packing the piston. Fig. 8 is a longitudinal section of the rear part of the cylinder and of the valve-gear, illustrating a modification in the mode of working the valve. Fig. 9 is a transverse section through the valve-wheels on the line 9 9, Fig. 8. Fig. 10 is a transverse section on the line 10 10, Fig. 8. Fig. 11 is a transverse section on the line 11 11, Fig. 8. Fig. 12 is a transverse section in the same plane as Fig. 11. The arrows applied to the various cutting-lines indicate the direction in which each section is viewed. Fig. 13 is a longitudinal section of the rear portion of the apparatus, illustrating the mode of embodying the invention in a double-acting machine.

A represents a drill or pick head of peculiar construction, attached, by screwing or other means, to a piston-rod, B, by which it is operated.

The drill is constructed with a flaring or divergent double point, *a a*, connected by a concave cutting face or edge, *a'*. This construction of the cutting-face and point preserves the drill from liability to be deflected from the face of the cut which it is forming, and imparts to it a tendency to hug or penetrate toward the face, which effectually counteracts the natural deflecting tendency of the face of the material against which it is working in case of it being employed in enlarging an under-cut or other channel in the coal.

In order to preserve the cutting-face of the drill in vertical or other required plane, to cause it to work as required, the operating-rod B is guided within the head D of the cylinder C. For this purpose the rod is formed with a longitudinal groove, *b*, receiving a tongue or feather, *d'*, within the guiding-nozzle or projecting end D' of the cylinder-head D.

The guiding of the drill-rod B may, if preferred, be effected by other means than those represented. For example, a set-screw may take the place of the spline or feather *d'*, or the rod may be made of square or other non-circular shape, as illustrated in Fig. 13, and fitted in a corresponding opening in the head.

The drill-head A may be secured from unscrewing or turning on the rod B by means of a pin or a spring-catch.

The rod B is of any required length to cause it to reach within the mass of coal and to form an under-cut or other channel of the required depth.

The cylinder C is of any necessary length to adapt the mechanism to impart the length of stroke required to the drill or pick.

$c$ $c'$ are the ports for the admission and discharge of compressed air or steam at the respective ends of the cylinder C, $c^2$ being a longitudinal duct which connects the port $c'$ with the valve-seat. $c^3$ is the exhaust-port.

E represents a reciprocating valve, adapted by its shape to admit steam to each of the ports $c$ $c'$ alternately, and placing the other in communication with the exhaust $c^3$ in customary manner. The valve E is operated by a crank or eccentric, F, which, in the simple form of the invention shown in Fig. 1, derives a continuous rotary motion from a bucket-wheel, G, operated by a current of compressed air, or steam-supply pipe H under the control of cock J and discharged through an exhaust-passage, O. The pipe H is in constant communication with the valve-chest K, so as to maintain a constant pressure within the valve-chest and apply the same to the respective ends of the piston P alternately whenever the ordinary throttle-valve is opened. Obviously, therefore, the mechanism for reciprocating the valve is operated independently of the drill-piston, and by means of a cock, J, the amount of compressed air or steam admitted to the valve-wheel G is regulated without interfering with the feed of the drill-cylinder, and therefore without changing the pressure applied to the piston in said cylinder. As a result of this relative arrangement of devices, the movement of the valve may be regulated so that it will be more or less rapid without changing the pressure upon the drill-piston, and hence the stroke of this piston will always remain regular in force, though the rapidity of its movement will be changing as the movement of the valve is changed. Furthermore, as the operation of the valve is independent of the piston, it will be constantly actuated, even though the drill may be stopped by sticking, or for any other reason, so that as soon as the drill is released it will commence to operate again instantaneously.

For packing the piston P it is preferable to employ the eccentric-cut ring illustrated in Fig. 7, by reference to which figure it will be seen that the ring is made much thinner on one side than the other, and is cut at its thinnest point—or, in other words, a disk of metal, from which the ring is to be formed, is bored eccentrically, and the ring then cut at the thinnest point. This causes the severed ends to spring outward and accurately fit the interior of the cylinder. Two such rings are employed on the piston in customary manner, so as to lap or break the joints.

In the modifications of the invention shown in Figs. 8 to 11, inclusive, the valve is worked by the positive pressure of steam, instead of by a current. For this purpose a pair of wheels, G' $G^2$, are constructed and coupled together in a manner common in rotary engines. These may act upon a reciprocating valve, E, through the medium of an eccentric or crank, F, in the manner described, or they may operate through gearing L L, Fig. 10, on a continuously-rotating valve, M, Fig. 11, constructed with a steam-port, $m$, of limited length, and an extended exhaust-port, occupying the chief part of its circumference. Fig. 12 shows a suitable valve-seat for this rotary valve, $c$ $c^2$ being the steam-ports leading to the respective ends of the cylinder, and $c^3$ the exhaust-port.

Two cylinders, C C', may be cast in one piece, as illustrated in Fig. 13, the valve E being operated in the manner before described with reference to Figs. 1 to 6, inclusive.

The steam-port $c'$ at the forward end of the cylinder C and the port $c^5$ at the rear end of the cylinder C' connect with one and the same port $c^7$ in the valve-seat. In like manner the steam-port $c^6$ at the forward end of the cylinder C' and the port $c$ of the cylinder C communicate with one port, $c^8$, in the valve-seat, the port $c$ of the cylinder C being represented in dotted lines.

Operation: The apparatus may be carried by one or more workmen, or may be supported in any other preferred manner, the connection of compressed air or steam with the pipe H being made by means of a flexible hose. The pick or drill being brought up to its work, the cock J is opened to a sufficient extent to impart the desired length and rapidity of stroke, and the apparatus being moved, as required, from side to side, the undercutting is quickly effected, and the "shearing-in" or any other cutting is done by the same apparatus, in readiness for displacing the mass of coal or other material.

If a short and quick stroke is required, the piston may be previously set at any desired position within the cylinder, and it will be reciprocated back and forth from this point by the action of the compressed air or steam under control of the valve-wheel.

As the valve-gear is independent of the operating piston, the motion of the valve will continue without interruption, whether the piston moves or not, so that in case the piston becomes locked no damage results; but the instant the piston is brought again into position to operate or is released its work will be resumed.

The projecting nose or end D' of the cylinder-head also provides a long bearing for the drill-rod, which gives strength and steadiness to the drill in its reciprocations.

I am aware that the rotary drills are commonly made with concave faces, and therefore do not claim such a drill.

Having thus described the invention, what is claimed as new, and desired to be secured by Letters Patent, is—

1. In a coal-mining machine, a drill-rod of irregular form in cross-section, in combination with a nose on the end of the piston-cylinder, provided with a bearing for the drill-rod corresponding in shape to the contour thereof, whereby said drill-rod is guided, supported, and prevented from turning, substantially as described.

2. The combination of the concave-faced or double-pointed pick-head A and the rod B, having a longitudinal reciprocating motion and guided by a tongue or groove, so as to retain the pick-points in a vertical plane.

3. The combination of the drill or pick A *a a'*, the piston-rod B, the cylinder C, and the cylinder-head D, constructed with a projecting nose, D', provided with means for guiding the drill-rod, in the manner explained.

4. In combination with a reciprocating drill or pick, A, and a piston, P, for operating the same, and a valve-motor, the pipe H, having direct communication with said piston, and a branch pipe, I, connecting the pipe H with the motor, as and for the purpose set forth.

SARAH J. HARRISON,
*Guardian of Jonathan W. Harrison.*

Witnesses:
F. R. GERTON,
NETTIE HARRISON.